US012739105B2

(12) United States Patent
Singh et al.

(10) Patent No.: US 12,739,105 B2
(45) Date of Patent: Sep. 15, 2026

(54) SECURE NON-TERRESTRIAL NETWORK LINKS UTILIZING QUANTUM KEY DISTRIBUTION INTEGRATED INTO A METASURFACE TRANSCODER NODE WITH HARDWARE POLARIZATION CONTROL

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 18/902,422

(22) Filed: Sep. 30, 2024

(65) Prior Publication Data

US 2026/0128868 A1 May 7, 2026

(51) Int. Cl.
*H04L 9/08* (2006.01)

(52) U.S. Cl.
CPC .................................. *H04L 9/0852* (2013.01)

(58) Field of Classification Search
CPC ..................................................... H04L 9/0852
See application file for complete search history.

(56) References Cited

U.S. PATENT DOCUMENTS 6,522,116 B1 2/2003 Jordan
10,211,532 B2 2/2019 Foo (Continued)

FOREIGN PATENT DOCUMENTS

CN 117768269 A 3/2024

OTHER PUBLICATIONS

Guangxin Liu, Wenjie Zhou, Dmitrii Gromyko, Ding Huang, Zhaogang Dong, Renming Liu, Juanfeng Zhu, Jingfeng Liu, Cheng-Wei Qiu, Lin Wu; Single-photon generation and manipulation in quantum nanophotonics. Appl. Phys. Rev. Mar. 1, 2025 (Year: 2025).*

(Continued)

*Primary Examiner* — Catherine Thiaw
*Assistant Examiner* — Daniel Elahian
(74) *Attorney, Agent, or Firm* — Amin, Turocy & Watson, LLP

(57) ABSTRACT

The technology described herein enhances the security of non-terrestrial network links by integrating quantum key distribution into an optically transparent metasurface transcoder node with hardware-based polarization control. The metasurface, composed of unit cells of metal-insulator transition material (such as vanadium dioxide, vanadium trioxide, or vanadium pentoxide) leverages the dynamic tunability of the metal-insulator transition material to manipulate the polarization and phase of photons, as needed for quantum key distribution protocols. Hardware level integration ensures secure key distribution with minimal signal loss, enhancing the robustness and security of satellite-terrestrial communication. The system dynamically adjusts to environmental conditions, optimizing performance and ensuring high fidelity in quantum key exchange, thereby providing a robust solution for secure communication in non-terrestrial networks. The transcoder's use of quantum key distribution allows for real-time detection of eavesdropping attempts, as interception of the quantum key exchange alters the photons'quantum states, alerting the system to potential security breaches.

20 Claims, 10 Drawing Sheets

(56) References Cited

U.S. PATENT DOCUMENTS

| | | | | |
|---|---|---|---|---|
| 10,770,790 | B1 | 9/2020 | Mahanfar | |
| 10,931,004 | B2 | 2/2021 | Yoo et al. | |
| 11,133,577 | B2 | 9/2021 | Wang et al. | |
| 11,329,375 | B1 | 5/2022 | West et al. | |
| 11,855,745 | B2 | 12/2023 | Schloemer | |
| 12,452,047 | B1 * | 10/2025 | Wang | H04L 9/0858 |
| 12,519,509 | B2 | 1/2026 | Zuo et al. | |
| 2014/0319638 | A1 * | 10/2014 | Chia | H10F 30/2255 257/438 |
| 2015/0380828 | A1 | 12/2015 | Black et al. | |
| 2016/0112117 | A1 | 4/2016 | Platzer et al. | |
| 2018/0062788 | A1 | 3/2018 | Mayer et al. | |
| 2019/0132044 | A1 | 5/2019 | Hreha et al. | |
| 2019/0334228 | A1 | 10/2019 | Haridas et al. | |
| 2021/0013619 | A1 | 1/2021 | Alkhateeb et al. | |
| 2022/0021125 | A1 | 1/2022 | Baligh et al. | |
| 2022/0026524 | A1 | 1/2022 | Maruyama et al. | |
| 2022/0085918 | A1 | 3/2022 | Luo et al. | |
| 2022/0182116 | A1 | 6/2022 | Raghavan et al. | |
| 2022/0231411 | A1 | 7/2022 | Lin | |
| 2022/0321198 | A1 | 10/2022 | Devoti et al. | |
| 2022/0330273 | A1 | 10/2022 | Kenney et al. | |
| 2022/0337240 | A1 | 10/2022 | Venkatesh et al. | |
| 2023/0099471 | A1 * | 3/2023 | Pascucci | H04L 9/0858 380/278 |
| 2023/0101393 | A1 | 3/2023 | Dai et al. | |
| 2023/0142735 | A1 | 5/2023 | Raghavan et al. | |
| 2023/0188170 | A1 | 6/2023 | Dutta et al. | |
| 2023/0254135 | A1 * | 8/2023 | Lyons | H04B 10/118 380/256 |
| 2023/0318818 | A1 * | 10/2023 | Sinha | H04L 9/083 |
| 2023/0319507 | A1 | 10/2023 | Gummadi et al. | |
| 2023/0403661 | A1 | 12/2023 | Kim et al. | |
| 2023/0413203 | A1 | 12/2023 | Ryu et al. | |
| 2024/0014862 | A1 | 1/2024 | Duan et al. | |
| 2024/0080184 | A1 * | 3/2024 | Yoshino | G01J 11/00 |
| 2024/0171447 | A1 | 5/2024 | Hemadeh et al. | |
| 2024/0204998 | A1 * | 6/2024 | Yeomans | H04L 9/0858 |
| 2024/0259087 | A1 | 8/2024 | Corey et al. | |
| 2024/0333398 | A1 * | 10/2024 | Bush | H04B 10/70 |
| 2024/0364019 | A1 | 10/2024 | Hussain | |
| 2024/0378930 | A1 | 11/2024 | Motos et al. | |
| 2024/0388361 | A1 | 11/2024 | Duan et al. | |
| 2024/0419404 | A1 * | 12/2024 | Burchard | H04B 10/70 |
| 2024/0429969 | A1 | 12/2024 | Hong et al. | |
| 2025/0062529 | A1 | 2/2025 | Nathan et al. | |
| 2025/0125525 | A1 | 4/2025 | Rossanese et al. | |
| 2025/0175217 | A1 | 5/2025 | Albanese et al. | |
| 2025/0274165 | A1 | 8/2025 | Manolakos et al. | |
| 2025/0343577 | A1 | 11/2025 | Abu Al Haija et al. | |
| 2025/0373340 | A1 * | 12/2025 | Abelson | H04B 10/70 |
| 2026/0046613 | A1 | 2/2026 | Elshafie et al. | |

OTHER PUBLICATIONS

P. I. Sund et al., "Processing single-photons from a quantum dot using high-speed integrated photonic circuits on the thin film lithium-niobate-on-insulator platform," 2023 Conference on Lasers and Electro-Optics (CLEO), San Jose, CA, USA, 2023 (Year: 2023).*

J. W. Silverstone et al., "Monolithic generation and manipulation of nondegenerate photon pairs within a silicon-on-insulator quantum photonic circuit," 2013 Conference on Lasers & Electro-Optics Europe & International Quantum Electronics Conference CLEO EUROPE/IQEC, Munich, Germany, 2013 (Year: 2013).*

Notice of Allowance received for U.S. Appl. No. 18/609,134 dated Sep. 16, 2025, 11 pages.

Non-Final Office Action received for U.S. Appl. No. 18/656,441 dated Sep. 22, 2025, 7 pages.

Notice of Allowance received for U.S. Appl. No. 18/656,441 dated Nov. 19, 2025, 5 pages.

Notice of Allowance received for U.S. Appl. No. 18/739,880 dated Nov. 12, 2025, 10 pages.

Notice of Allowance received for U.S. Appl. No. 18/797,975 dated Sep. 19, 2025, 9 pages.

Healy, et al. "Layer-1 Physical Interface Transcoder Leveraging Metasurfaces" U.S. Appl. No. 18/899,886, filed Sep. 27, 2024, 63 pages.

Healy, et al. "Connecting Wi-Fi-Enabled Device to Non-Terrestrial Satellite Constellations" U.S. Appl. No. 18/899,909, filed Sep. 27, 2024, 55 pages.

Khaira, et al. "Layer-1 Physical Interface Transcoder With Signal Processing Capabilities to Support Hybrid Terrestrial and Non-Terrestrial Ground and Space Mesh Network" U.S. Appl. No. 18/902,052, filed Sep. 30, 2024,79 pages.

Healy, et al. "Universal Layer-1 Physical Interface Transcoder for Terrestrial and Non- Terrestrial Air-Interfaces" U.S. Appl. No. 18/899,739, filed Sep. 27, 2024, 62 pages.

Singh, et al. "Metasurface Integrated Non-Terrestrial Network Transcoder With Adaptive Slicing for Dynamic Allocation of Mesh Resources" U.S. Appl. No. 18/902,100, filed Sep. 30, 2024, 64 pages.

Singh, et al. "Edge Computing and Metasurfaces in Non-Terrestrial Network-Connected Transcoder Nodes" U.S. Appl. No. 18/902,158 filed Sep. 30, 2024, 66 pages.

Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.

Singh, et al. "Allocating Primary and Secondary Metasurface Integrated Non-Terrestrial Network Transcoder Nodes" U.S. Appl. No. 18/902,360, filed Sep. 30, 2024, 64 pages.

Healy, et al. "Model-Controlled Layer-1 Physical Interface Transcoder To Support Hybrid Terrestrial and Non-Terrestrial Ground and Space Mesh Network" U.S. Appl. No. 18/899,504, filed Sep. 27, 2024, 64 pages.

Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.

Singh, et al. "Signal Correction Based on Environmental Factors in Metasurfaces for Non-Terrestrial Network Transcoder Nodes" U.S. Appl. No. 18/902,454, filed Sep. 30, 2024, 53 pages.

Singh, et al. "Reconfigurable Intelligent Surface Integrated on Compact Drones for Wireless Network Survey" U.S. Appl. No. 18/913,434, filed Oct. 11, 2024, 36 pages.

Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.

Khaira, et al. "Energy-Efficient Active Reconfigurable Intelligent Surface With Selective Amplification" U.S. Appl. No. 18/609,134 filed Mar. 19, 2024, 39 pages.

Singh, et al. "Real-Time Data Management and Integrity Assurance for Artificial Intelligence-Driven Millimeter Wave Advanced Metasurfaces" U.S. Appl. No. 18/656,407, filed May 6, 2024, 44 pages.

Singh, et al. "Reconfigurable Intelligent Surfaces That Self Heal and Adapt By Altering the Tile Geometry" U.S. Appl. No. 18/656,431, filed May 6, 2024, 74 pages.

Singh, et al. "Predictive Signal Boosting in Distributed Tile Controllers for Reconfigurable Metasurfaces" U.S. Appl. No. 18/656,441, filed May 6, 2024, 54 pages.

Ye, et al. "Enhancing Non-Terrestrial Network Direct-to-Everything Service With Metasurfaces" U.S. Appl. No. 18/739,880, filed Jun. 11, 2024, 39 pages.

Singh, et al. "Metasurface Subarrays With Integrated Amplification and Tunable Delay for Estimating Angle of Arrival and Redirecting Wireless Signals" U.S. Appl. No. 18/750,710, filed Jun. 21, 2024, 41 pages.

Healy, et al. "Transcoding the Air-Interface Between Non-Terrestrial and Terrestrial Networks Leveraging Integrated Transcoder and Metasurface Mounted on a Drone" U.S. Appl. No. 18/780,254, filed Jul. 22, 2024, 61 pages.

Healy, et al. "Communication Between Non-Terrestrial and Terrestrial Networks Based on Layer-1 Physical Packet-Level Transcoding" U.S. Appl. No. 18/780,269, filed Jul. 22, 2024, 59 pages.

(56) References Cited

OTHER PUBLICATIONS

Singh, et al. "Reconfigurable Intelligent Surface With Variable Amplification and Attenuation Including Angle of Arrival Estimation of Wireless Signals" U.S. Appl. No. 18/797,975, filed Aug. 8, 2024, 46 pages.
qorvo.com, "CMD262 26-28 GHz (Ka Band) GaN Power Amplifier", Rev-A, URL—https://www.qorvo.com/products/p/CMD262, Jun. 14, 2022, 1 page.
Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.
Long et al., "Active Reconfigurable Intelligent Surface Aided Wireless Communications", IEEE Transactions on Wireless Communications, vol. 20, No. 8, Aug. 2021, pp. 4962-4975.
Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.
Gros et al., "A Reconfigurable Intelligent Surface at mmWave Based on a Binary Phase Tunable Metasurface", IEEE Open Journal of the Communications Society, vol. 2, 2021, pp. 1055-1064.
Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.
Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.
Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.
Ojaroudi et al., "Graphene-Based Reconfigurable Intelligent Meta-Surface Structure for THz Communications", 15th European Conference on Antennas and Propagation, 2021, 5 pages.
Tasci et al., "A New RIS Architecture With a Single Power Amplifier: Energy Efficiency and Error Performance Analysis", IEEE Access, Apr. 2022, 11 pages.
Bai et al., "RIS-Assisted Green Secure Communications: Active RIS or Passive Ris?", IEEE Wireless Communications Letters, Dec. 6, 2022, 5 pages.
Goldman et al., "SpaceX and T-mobile Focus on Direct Satellite-to-Smartphone to Improve Mobile Coverage in Remote Areas", Analysys Mason, Aug. 2022, 5 pages.
Jewett, Rachel, "How Big is the Satellite Industry's Direct-to-Device Opportunity?", Via Satellite, Sep. 12, 2023, Url-https://www.satellitetoday.com/connectivity/2023/09/12/how-big-is-the-satellite-industrys-direct-to-device-opportunity/, Retrieved from the internet Dec. 2, 2024, 4 pages.
"Electromagnetic Metasurface", Wikipedia, URL- https://en.wikipedia.org/wiki/Electromagnetic_metasurface#, Retrieved from the internet Dec. 2, 2024, 9 pages.
Schweber, Bill., "The Doppler Effect: From Highly Ridiculed to Absolutely Indispensable, Part 1", Electrical Engineering News and Products, Apr. 19, 2022, URL- https://www.eeworldonline.com/the-doppler-effect-from-highly-ridiculed-to-absolutely-indispensable-part-1/, Retrieved from the internet Dec. 2, 2024, 14 pages.
"Doppler Effect", Wikipedia, URL-https://en.wikipedia.org/wiki/Doppler_effect, Retrieved from the internet Dec. 2, 2024, 8 pages.
Long et al., "A Promising Technology for 6G Wireless Networks: Intelligent Reflecting Surface", Journal of Communications and Information Networks, vol. 6, No. 1, Mar. 2021, 16 pages.
Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.
Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.
Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.
3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.
3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.
3GPP TS 38.108 V17.0.0, 3rd Generation Partnership Project; Technical Specification Group Radio Access Network; NR; Satellite Access Node radio transmission and reception, (Release 17), Jun. 2022, 58 pages.
"DVB", Wikipedia, URL-https://en.wikipedia.org/wiki/DVB, Retrieved from the internet Dec. 2, 2024, 12 pages.
"DVB-S", Wikipedia, URL-https://en.wikipedia.org/wiki/DVB-S, Retrieved from the internet Dec. 2, 2024, 2 pages.
"DVB-S2", Wikipedia, URL-https://en.wikipedia.org/wiki/DVB-S2, Retrieved from the internet Dec. 2, 2024, 7 pages.
"DVB-S2X", Wikipedia, URL-https://en.wikipedia.org/wiki/DVB-S2X, Retrieved from the internet Dec. 2, 2024, 2 pages.
The Ad Hoc Group., "White Paper on the use of DVB-S2X for DTH Applications, DSNG & Professional Services, Broadband Interactive Services and VL-SNR applications", Digital Video Broadcasting, Mar. 2015, 16 pages.
DVB Org., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.
DVB Org., "Second Generation Framing Structure, Channel Coding and Modulation Systems for Broadcasting, Interactive Services, News Gathering and Other Broadband Satellite Applications; Part 2: DVB-S2 Extensions (DVB-S2X)", DVB Document A083-2 Rev.4, Feb. 2024, 166 pages.
"Facts and Figures 2022—Mobile Network Coverage 2022", ITU, URL—https://www.itu.int/itu-d/reports/statistics/2022/11/24/ff22-mobile-network-coverage/, Retrieved from the internet Dec. 2, 2024, 4 pages.
Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.
ETSI EN 300 421 V1.1.2, "Digital Video Broadcasting (DVB); Framing Structure, Channel Coding and Modulation for 11/12 Ghz Satellite Services", Aug. 1997, 24 pages.
ETSI EN 302 307-1 V1.4.1, "Digital Video Broadcasting (DVB); Second Generation Framing Structure, Channel Coding and Modulation Systems for Broadcasting, Interactive Services, News Gathering and Other Broadband Satellite Applications; Part 1: DVB-S2", Jul. 2014, 80 pages.
ETSI EN 302 307 V1.2.1, Digital Video Broadcasting (DVB); Second Generation Framing Structure, Channel Coding And Modulation Systems for Broadcasting, Interactive Services, News Gathering and Other Broadband Satellite Applications (DVB-S2), Aug. 2009, 78 pages.
ETSI TR 102 376-1 V1.2.1, "Digital Video Broadcasting (DVB); Implementation Guidelines for the Second Generation System For Broadcasting, Interactive Services, News Gathering and other Broadband Satellite Applications; Part 1: DVB-S2", Nov. 2015, 118 pages.
ETSI TR 102 376-2 V1.2.1, "Digital Video Broadcasting (DVB); Implementation Guidelines for the Second Generation System for Broadcasting, Interactive Services, News Gathering and other Broadband Satellite Applications; Part 2: S2 Extensions (DVB-S2X)", Jan. 2021, 212 pages.

(56) References Cited

OTHER PUBLICATIONS

Lee et al., "Integrated DVB-X2 Receiver Architecture with Common Acceleration Engine", Applied Sciences, vol. 9, No. 3983, Sep. 23, 2019, 16 pages.
Nemer, Elias., "Physical Layer Impairments in DVB-S2 Receivers", Second IEEE Consumer Communications and Networking Conference, 2005, pp. 487-492.
DVB Org., "White Paper on the use of DVB-S2X for DTH applications, DSNG & Professional Services, Broadband Interactive Services and VL-SNR applications", DVB Document A172, Mar. 2015, 16 pages.
Babcock, Stephen., "AT&T Invested $450M in Maryland Network Upgrades Over 3 Years", Technical.ly, URL—https://technical.ly/startups/att-invested-450m-in-maryland-network-upgrades-over-3-years/, Jul. 9, 2019, Retrieved from the internet Dec. 2, 2024, 7 pages.
Tyree et al., "AT&T Providing Cell on Wheels to Help with Internet Connection at LU's Graduation", URL—https://wset.com/news/local/att-providing-cell-on-wheels-to-help-with-internet-connection-at-lus-graduation, May 10, 2017, Retrieved from the internet Dec. 2, 2024, 6 pages.
ITU, "H.222.0 : Information Technology-Generic Coding of Moving Pictures and Associated Audio Information: Systems", International Telecom Union, Aug. 2018, 306 pages.
Cioni et al., "DVB-S2X Physical Layer Performance Results Over Realistic Channel Models", International Journal of Satellite Communications and Networking, vol. 34, No. 3, Jul. 2015, 21 pages.
"MPEG Transport Stream", Wikipedia, URL-https://en.wikipedia.org/wiki/MPEG_transport_stream, Retrieved from the internet Dec. 2, 2024, 10 pages.
Keese, Col. John E., "Satellite Telemetry, Tracking and Control Subsystems", Massachusetts Institute of Technology, Oct. 29, 2003, 35 pages.
NASA, "State-of-the-Art of Small Spacecraft Technology", NASA 9.0 Communications, Feb. 12, 2024, 32 pages.
Stuhlfauth, Reiner. "5G NTN Takes Flight: Technical Overview of 5G Non-Terrestrial Networks", Rohde & Schwarz, White Paper, Version 01.00, 2022, 124 pages.
Dhaou, Riadh. "Modeling of Networks Composed of Satellite Constellations" University of Paris VI Dissertation, Nov. 8, 2002 [https://www.researchgate.netpublication/265231818_MODELING_OF_NETWORKS_COMPOSED_OF_SATELLITE_CONSTELLATIONS], 225 pages.
"Aerial SDK Layer 1" NVIDIA Docs Hub, https://docs.nvidia.com/aerial/archive/aerial-sdk/23-1/text/product_brief/aerial_sdk_layer_1.html] retrieved Jan. 16, 2025, 30 pages.
Notice of Allowance received for U.S. Appl. No. 18/902,100 dated Mar. 10, 2026, 9 pages.
Notice of Allowance received for U.S. Appl. No. 18/656,407 dated Mar. 19, 2026, 11 pages.
Notice of Allowance received for U.S. Appl. No. 18/750,710 dated Apr. 21, 2026, 12 pages.
Liu et al., "Dynamic-Controlled RIS Assisted Multi-User MISO Downlink System: Joint Beamforming Design", In IEEE Transactions on Green Communications and Networking, vol. 6, No. 2, Jun. 2022, pp. 1069-1081.
Non-Final Office Action received for U.S. Appl. No. 18/780,254 dated May 29, 2026, 17 pages.
Non-Final Office Action received for U.S. Appl. No. 18/780,269 dated May 29, 2026, 16 pages.

* cited by examiner

SECURE NON-TERRESTRIAL NETWORK LINKS UTILIZING QUANTUM KEY DISTRIBUTION INTEGRATED INTO A METASURFACE TRANSCODER NODE WITH HARDWARE POLARIZATION CONTROL

BACKGROUND

Ensuring secure communication between satellites and terrestrial nodes is highly valuable in virtually any terrestrial-to-non-terrestrial communication system. Traditional encryption methods have become increasingly vulnerable to sophisticated attacks, leading to the adoption of advanced security protocols like quantum key distribution (QKD).

However, implementing QKD in non-terrestrial networks poses significant challenges, including the need for precise control over photon properties and the mitigation of signal loss during transmission. Existing solutions often fail to provide the dynamic control and efficiency needed for reliable QKD. Moreover, various QKD solutions are very expensive to implement.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
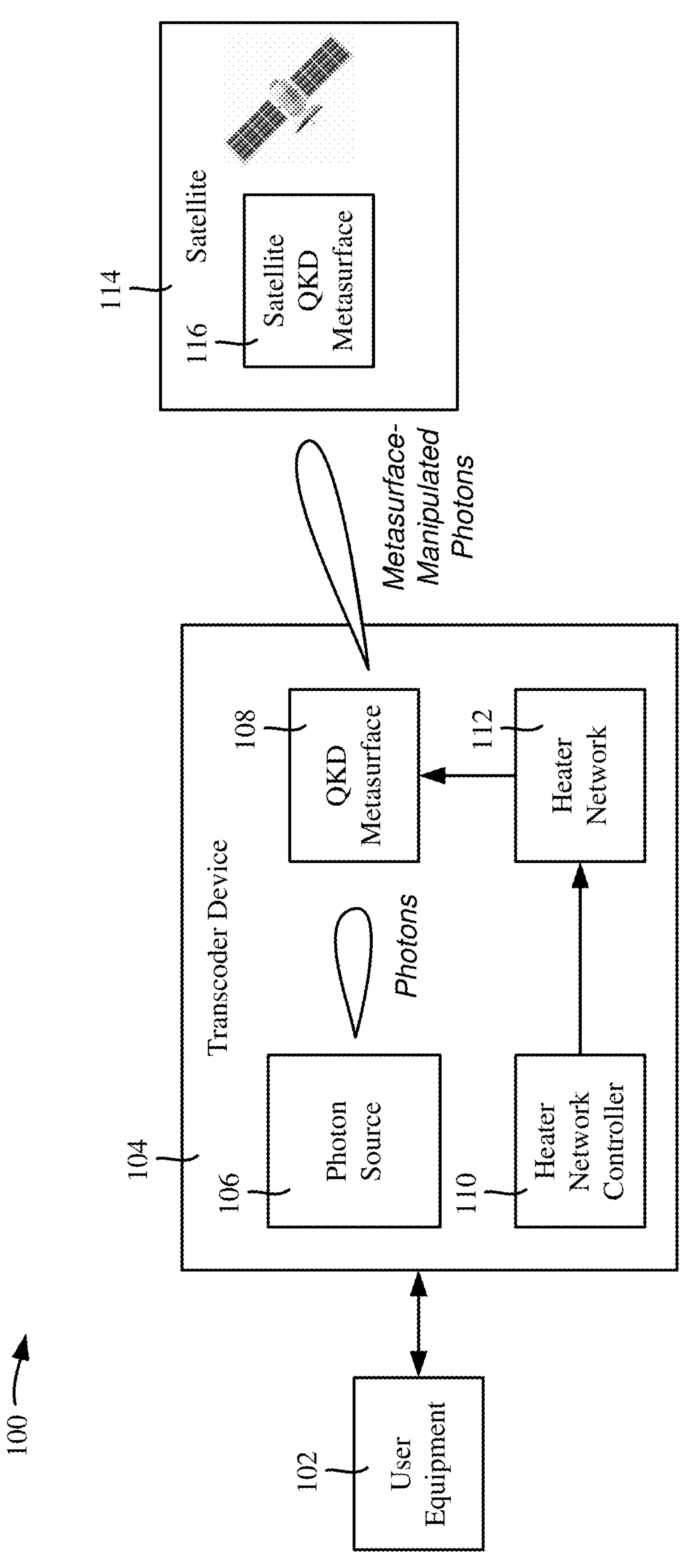
FIG. 1 is a representation of an example system for quantum key distribution (QKD) based on metasurfaces, in accordance with various example embodiments and implementations of the subject disclosure.

The technology described herein is generally directed towards a hardware-based implementation of photon polarization control for tamperproof transmission, based on integrating quantum key distribution (QKD) and metasurfaces. The technology facilitates real-time eavesdropping detection, in that a transcoder device that uses QKD, as interception of the quantum key exchange in an eavesdropping attempt alters the quantum states of the photons, alerting the system to potential security breaches virtually instantaneously.

The metasurface can be manufactured and designed with unit cells that are based on a metal-insulator-transition material such as vanadium dioxide ($VO_2$). This facilitates photon polarization control by controllably heating portions of the unit cells to determine the conductive versus non-conductive portions of the unit cells.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being “directly on” or “directly over” another element, are there no intervening element(s) present. Note that orientation is generally relative; e.g., “on” or “over” can be flipped, and if so, can be considered unchanged, even if technically appearing to be under or below/beneath when represented in a flipped orientation. It will also be understood that when an element is referred to as being “connected” or “coupled” to another element, it can be directly connected or coupled to the other element or intervening elements can be present. In contrast, only if and when an element is referred to as being “directly connected” or “directly coupled” to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a representation of one example system 100 in which a user equipment 102 is coupled to a transcoder device 104. In general, the transcoder device 104 (e.g., implemented as a “box” structure) includes or is coupled to a photon source 106 that transmits photons to a QKD metasurface 108 as described herein. The QKD metasurface 108 is fabricated using an optically transparent material with metal-insulator-transition material, such as $VO_2$ thin film unit cells, as also described herein. Note that the QKD metasurface 108 is shown in FIG. 1 as being integrated into the transcoder device 104, however it is feasible to have the QKD metasurface 108 be a separate structure closely coupled to the transcoder device 104.

Vanadium alloys (e.g., thin films) exhibit the ability to switch between metallic and insulating phases in response to temperature changes. This characteristic enables portions/areas of the vanadium alloy material to be in a high resistance state or a low resistance state, e.g., through heating applications. Although any of the three oxides (vanadium trioxide, vanadium dioxide, or vanadium pentoxide) can be used as metal-insulator-transition material, in general vanadium dioxide ($VO_2$) provides better contrast between metal and insulating states. Thus, although $VO_2$ is referred to in the examples herein, these are nonlimiting examples, and any metasurface-suitable metal-insulator-transition material can be used.

More particularly, the phase transition property of $VO_2$ can be triggered by temperature changes or electrical stimulation, and thus the example transcoder device 104 includes or is coupled to a heater network controller 110 and a heater network 112, e.g., beneath the QKD metasurface 108. Note that the heater network 112 is generally optically transparent, e.g., has very thin resistive materials that do not block very much of the signals transmitted through the metasurface. Although not explicitly depicted in FIG. 1, electrical stimulation can also change the phase transition property of $VO_2$, and it is understood that the heater network controller 110 and heater network 112 is only one nonlimiting option for controlling the conductive and non-conductive states of the $VO_2$.

The photons emitted from the photon source are controllably altered in their quantum states (e.g., polarization and/or phase) by the of $VO_2$-based metasurface. The manipulated photons are transmitted to the satellite 114, which has a counterpart (e.g., $VO_2$-based) QKD metasurface 116 as described herein.

Figure 2:
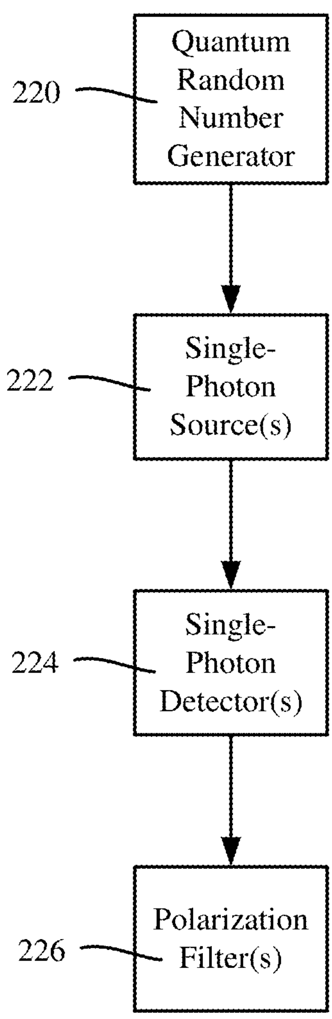
FIG. 2 is a representation of example hardware of a QKD system, in accordance with various example embodiments and implementations of the subject disclosure.

In general, quantum keys provide a level of encryption that is theoretically unbreakable by conventional computing methods. The nature of quantum key distribution makes the transmission tamper-proof, protecting against unauthorized modifications. The process of quantum random number generation and quantum key distribution (QKD) are well established. To summarize in terms of hardware implementation, FIG. 2 shows integrating a quantum random number generator 220 to generate truly random keys. As is known QKD system uses photons to transmit encryption keys, employing protocols such as BB84 or E91 in which quantum properties of photons (e. g., polarization) are used to encode and transmit keys. To this end, components for a QKD system can include one or more single photon sources 222, single photon detector(s) 224, and polarization filter(s) 226. Note that most military satellites are equipped with the infrastructure to facilitate secure key exchange with ground stations.

In general, QKD is based on installing optical communication interfaces to support the transmission of quantum keys over fiber optics for terrestrial communications, or free-space optics for non-terrestrial communications. A quantum key management system and protocols for securely distributing keys between terrestrial and satellite systems, involving real-time key negotiation and management, can be used. Securely storing and managing the lifecycle of quantum keys, including key renewal and revocation processes, is also part of any such system.

Software modules for real-time encryption and decryption of data are needed for using the generated quantum keys. Well-established QKD protocols (e.g., BB84 or E91) are integrated for secure key exchange, enabling secure transmission of keys between a terrestrial device (e.g., a transcoder as described herein) and a satellite. Quantum error correction techniques can be used to ensure the integrity and reliability of quantum keys during transmission. Significantly, any attempt to eavesdrop on the key exchange process immediately alters the quantum states of the keys, making such attempts detectable. This inherent security feature ensures that communication links are continuously monitored for potential security breaches, enhancing the integrity and confidentiality of data transmission.

Figure 3:
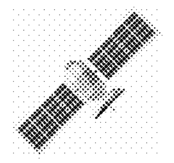
FIG. 3 is a representation of a QKD metasurface manipulating photons, in accordance with various example embodiments and implementations of the subject disclosure.
Figure 3:
Figure 3:
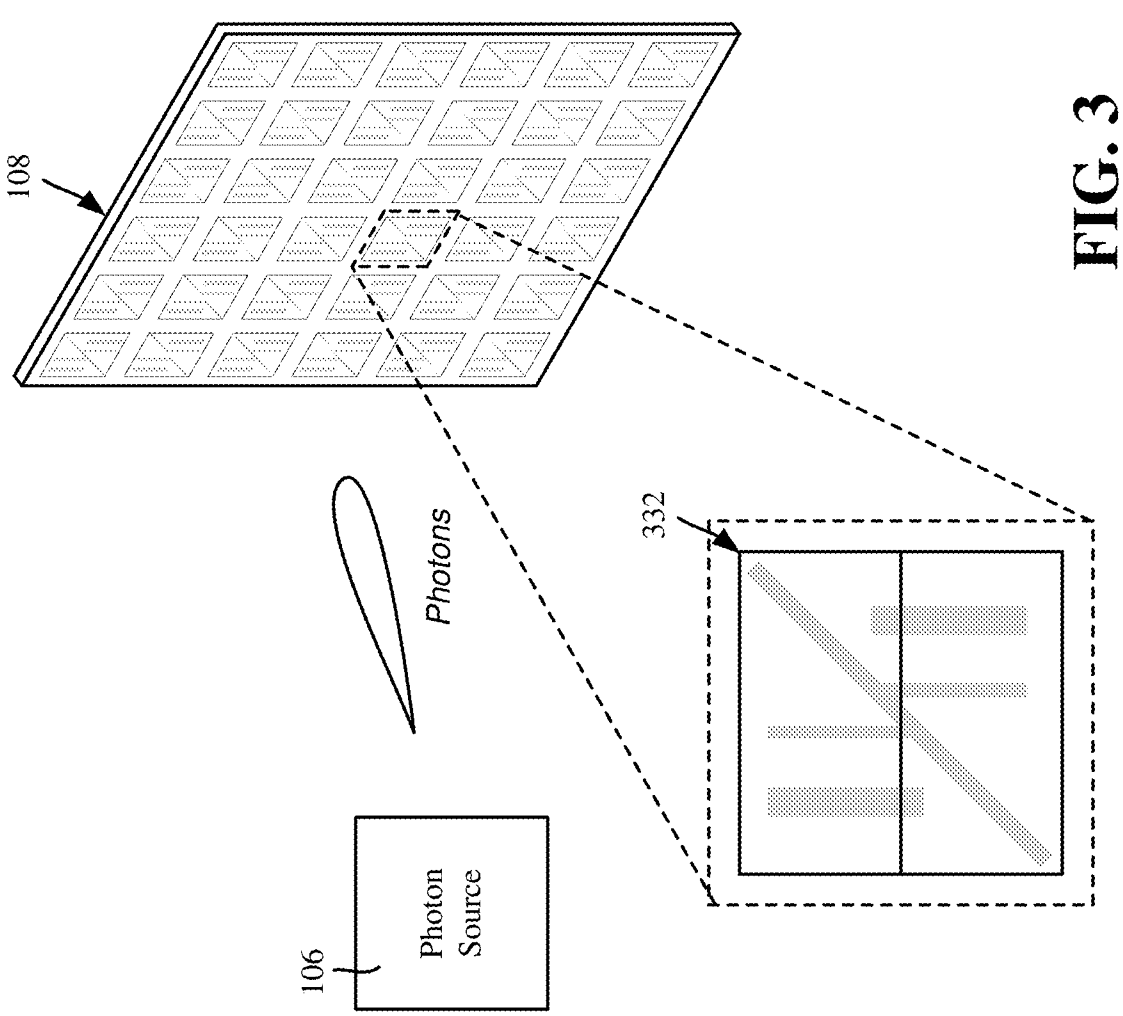

FIG. 3 shows the concept of the QKD metasurface 108 manipulating the photons based on unit cells composed of metal-insulator-transition material, e.g., $VO_2$ in this example. One of the unit cells 332 is shown as enlarged, to emphasize various conductive (shaded) portions of the unit cell relative to the non-conductive portions/area (unshaded).

Figure 4:
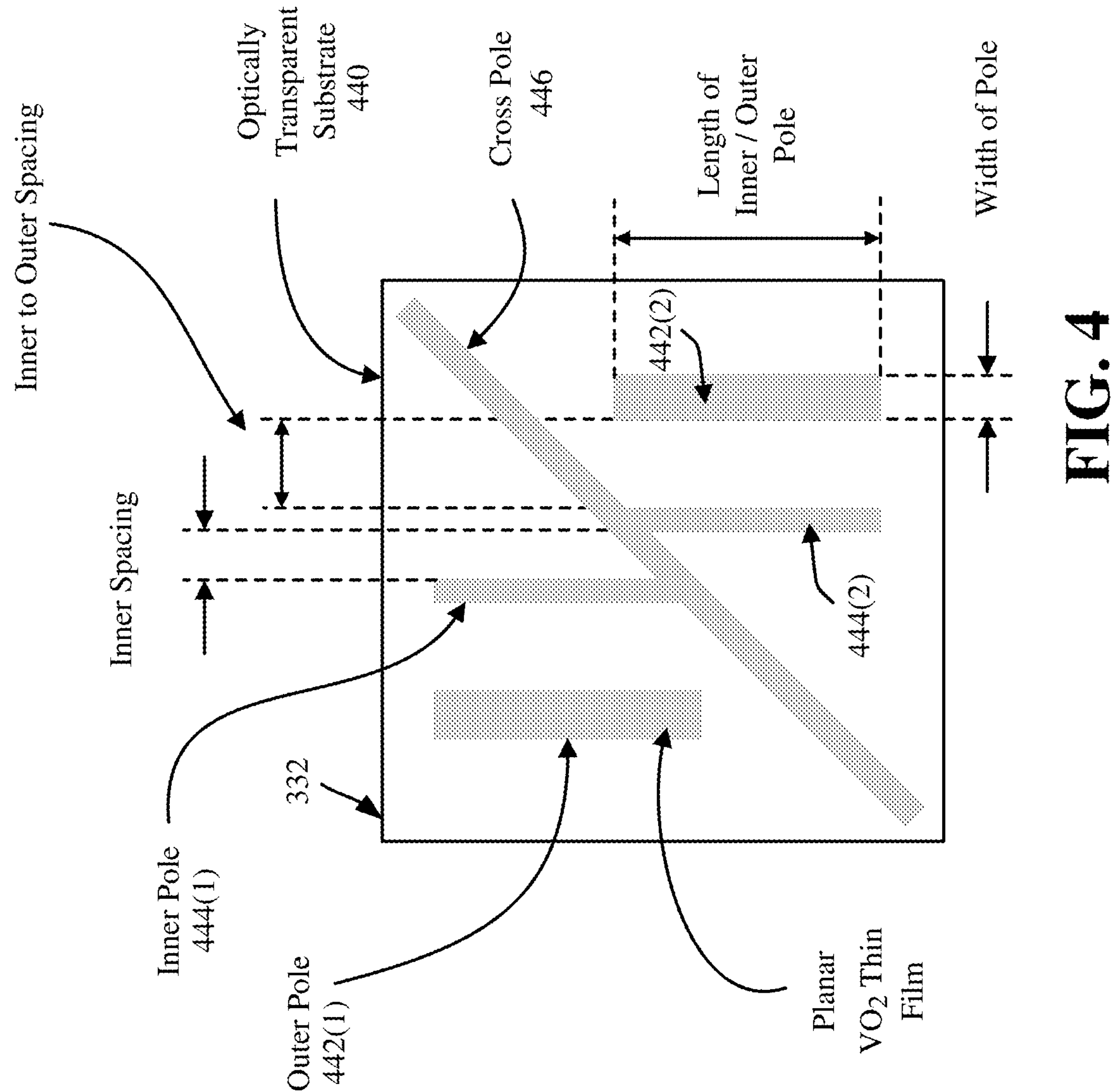
FIG. 4 is a top view representation of an example unit cell of a QKD metasurface as described herein, illustrating various non-conductive and conductive (poles) areas, and various controllable dimensions that determine photon quantum state (e.g., polarization) manipulation, in accordance with various example embodiments and implementations of the subject disclosure.

FIG. 4 shows the metasurface unit cell 332 for QKD along with various conductive portions “poles” and variable dimensions. As can be seen, in this example the VO2 states (fabricated with planar thin V02 film atop an optically transparent substrate 440) have been controlled (e.g., heated or not heated) to form the conductive portions (represented as shaded rectangles) including two outer poles 442(1) and 442(2), two inner poles 444(1) and 444(2), and a diagonal cross pole 446. In this example, the two inner poles 444(1) and 444(2) are conductively coupled to the cross pole 446.

Variable dimensions, corresponding to a phase change profile that determines the polarization of the photons, include the widths of the outer poles 442(1) and 442(2), widths of the inner poles 444(1) and 444(2), lengths of the outer poles 442(1) and 442(2), and lengths of the inner poles 444(1) and 444(2). Length and width of the cross pole 446 can also be varied. Any of the angles of the poles can also be varied.

Additional variable dimensions that factor into the polarization change to the photons can include inner spacing between the inner poles, and inner pole-to-outer pole spacing. Note that FIG. 4 shows symmetrical distribution of the poles, however this is not a requirement. Further, not every unit cell in a metasurface needs to be shaped/dimensioned the same as each other.

Figure 5A:
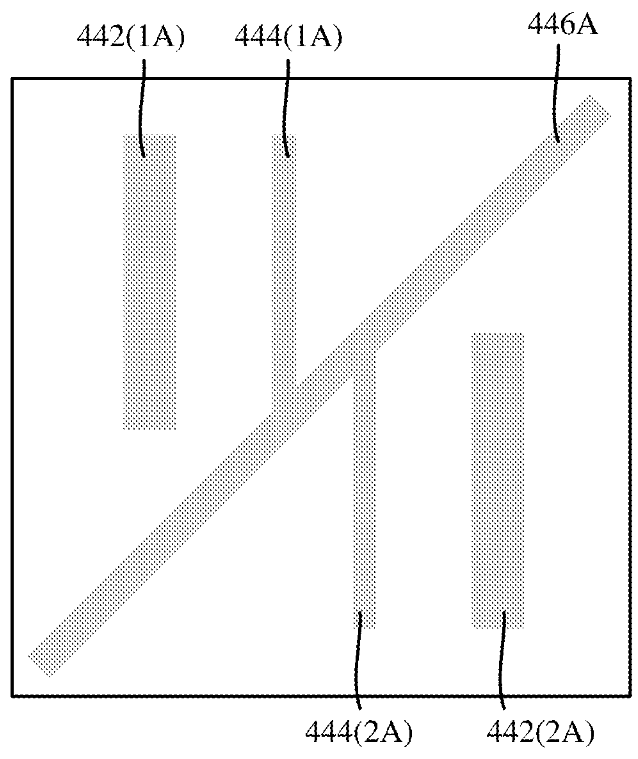
FIGS. 5A and 5B are top view representations of an example unit cell of a QKD metasurface, illustrating changes to dimensions of various non-conductive and conductive (poles) areas that determine photon quantum state (e.g., polarization) manipulation, in accordance with various example embodiments and implementations of the subject disclosure.
Figure 5B:
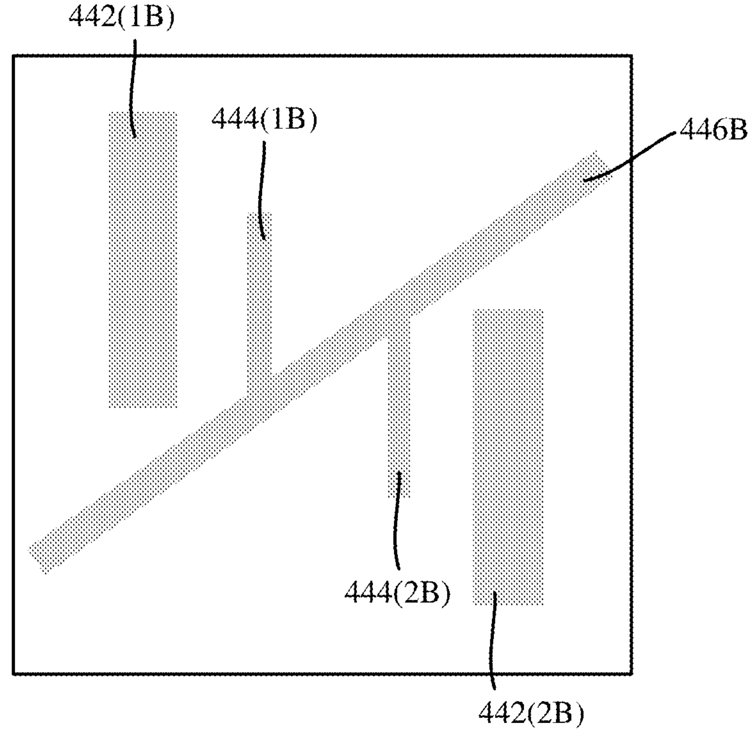

FIGS. 5A and 5B show changing the dimensions in a unit cell from a first time to a second time; FIG. 5A corresponds to the unit cell of FIG. 4. In FIG. 5B, relative to FIG. 4, the VO2 has been controlled such that the widths of the outer poles 442(1A) and 442(2A) in FIG. 5A to 442(1B) and 442(2B) in FIG. 5B, the lengths of the inner poles 444(1A) and 444(2A) in FIG. 5A to 444(1B) and 444(2B) in FIG. 5B, and the length and angle of the cross pole 446A (FIG. 5A) and 446B (FIG. 5B). The inner pole spacing and the inner-to-outer pole spacing has also been varied. As can be readily appreciated, the dimensions can be changed on a schedule known to the transcoder and satellite, so that a new quantum key can be exchanged.

Figure 6:
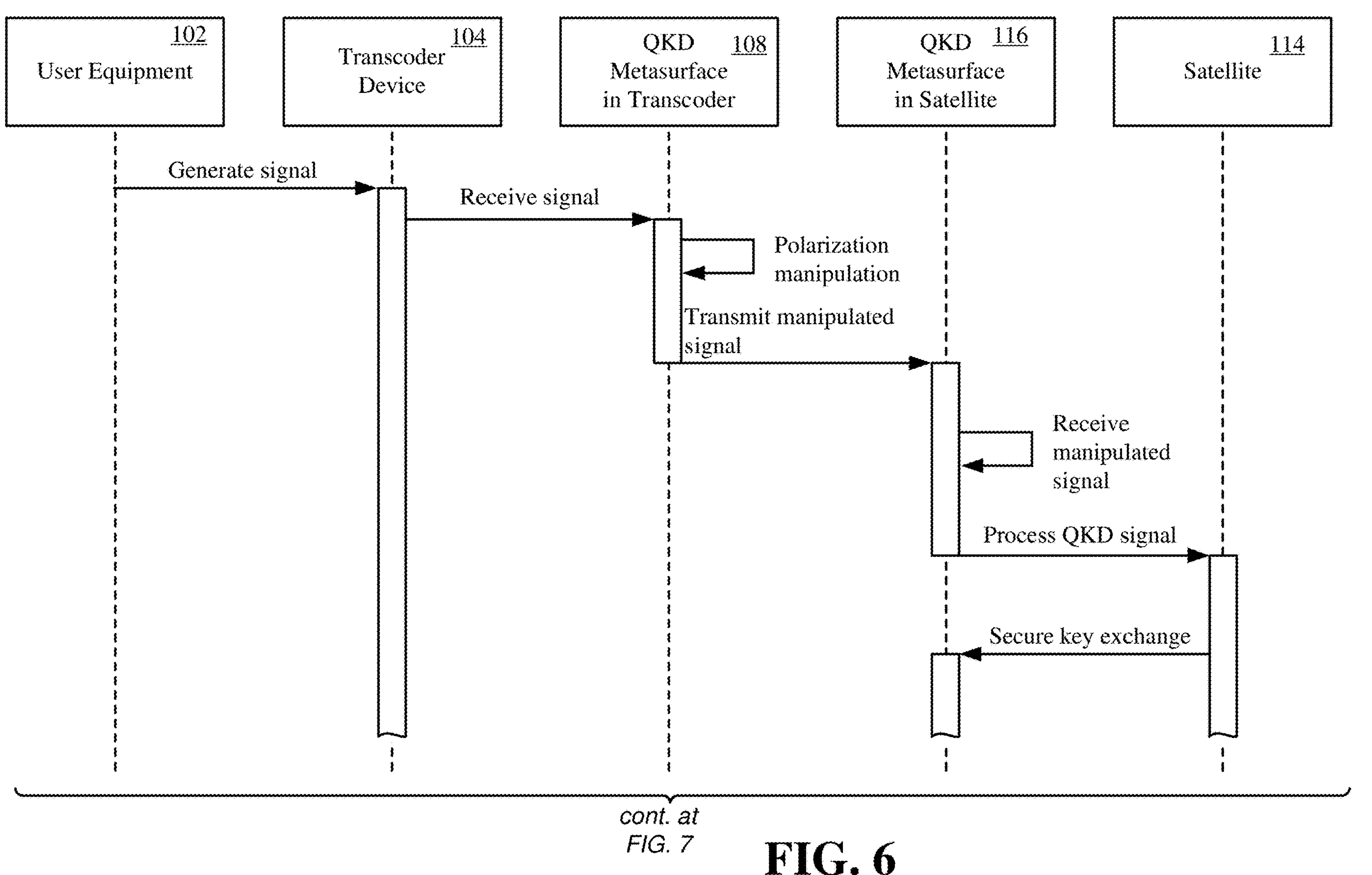
FIGS. 6 and 7 comprise a sequence diagram showing secure key distribution between a non-terrestrial satellite and a terrestrial transcoder device and user equipment, in accordance with various example embodiments and implementations of the subject disclosure.
Figure 7:
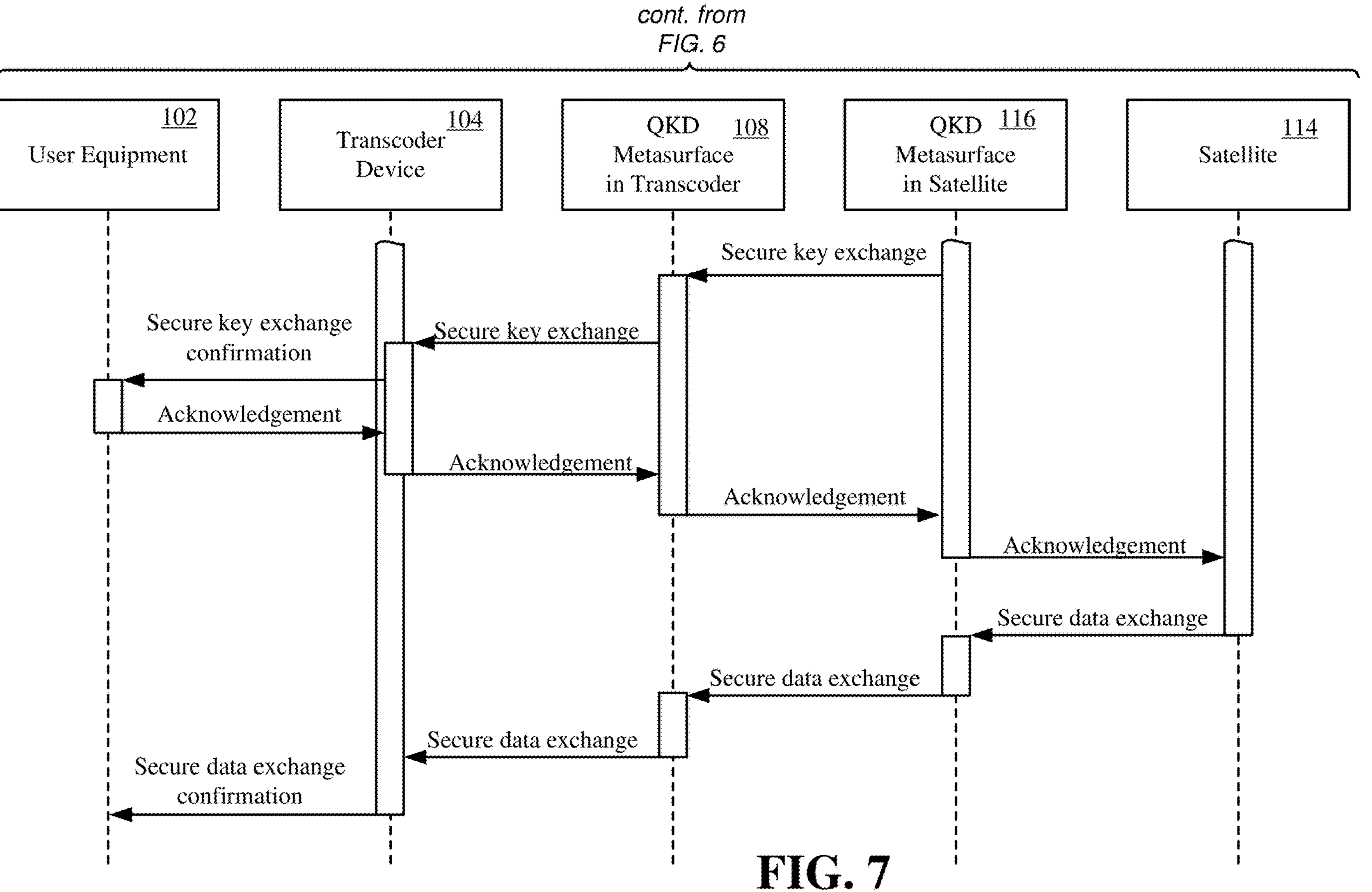

Turning to an end-to-end description of QKD based on the metasurface as described herein, one example process, shown in FIGS. 6 and 7, begins with the user equipment 102 (UE) generating a signal intended for secure communication as shown in FIG. 6. This signal represents the initial data that needs to be transmitted securely across the network. The UE 102 sends this generated signal to the transcoder device 104, which marks the activation of the transcoder device 104 as it receives and begins processing the signal. The transcoder device 104 acts as an intermediary device that prepares the signal for secure transmission through quantum key distribution.

Upon receiving the signal from the UE, the transcoder device 104 forwards it to the QKD metasurface 108 within the transcoder device 104 (e.g., in a QKD_Box). This QKD_Box is equipped with a metasurface 108 made of $VO_2$ film unit cells, which dynamically manipulate the polarization and phase of the incoming photons. The QKD_Box becomes active and performs the necessary polarization manipulation on the signal to prepare it for QKD. This manipulation ensures that the quantum states of the photons are accurately controlled, providing the security required for QKD protocols.

After the polarization manipulation is complete, the QKD_Box transmits the manipulated signal to the QKD metasurface 116 in the satellite 114 (QKD_Sat). The QKD_Box deactivates, as its role in this phase is complete, and the QKD_Sat activates to receive the incoming manipulated signal. The QKD_Sat processes the received signal, focusing on the QKD aspects to establish a secure communication link. This involves measuring the quantum states of the photons and using them to generate a secure encryption key.

Once the QKD_Sat processes the signal, the QKD_Sat communicates with the satellite 114 for the secure key exchange. The satellite 114 becomes active, confirming the secure key exchange with the QKD_Sat. This exchange ensures that both the satellite 114 and the transcoder device 104 have synchronized encryption keys, which are crucial for secure data transmission. The Sat then deactivates the QKD_Sat after confirming the key exchange.

As shown in FIG. 7 where the process continues, the secure key is then propagated back through the QKD metasurface 108 in the transcoder device 104, and the transcoder device 104 itself, reaching the user equipment 102. The transcoder device 104 confirms the secure key exchange with the UE 102, activating the UE 102 in the process. The UE 102 sends an acknowledgment back to the transcoder device 104 to confirm that it has received the secure key and is ready for data exchange. This acknowledgment travels back through the transcoder device 104 to the QKD metasurface 108 in the transcoder device 104 and then to the QKD metasurface 116 in the satellite 114, finally reaching the satellite 114, ensuring that the components are synchronized and ready for secure data transmission.

Once the acknowledgment is received, the satellite 114 initiates the secure data exchange. This involves sending secure data back through the QKD metasurface 116 in the satellite 114 to the QKD metasurface 108 in the transcoder device 104. The QKD metasurface 108 in the transcoder device 104 ensures the data remains secure by maintaining the manipulated polarization states as specified by the QKD protocol. The data then passes through the transcoder device 104 and finally reaches the user equipment 102. The transcoder device 104 and the user equipment 102 confirm the secure data exchange, marking the successful completion of the process.

Throughout this sequence, each component activates and deactivates as necessary to perform its specific role, ensuring an efficient and secure data exchange process. The integration of metasurfaces and QKD provides robust security features, such as dynamic polarization control and minimal signal loss, enhancing the overall reliability and security of the communication system in non-terrestrial networks.

Figure 8:
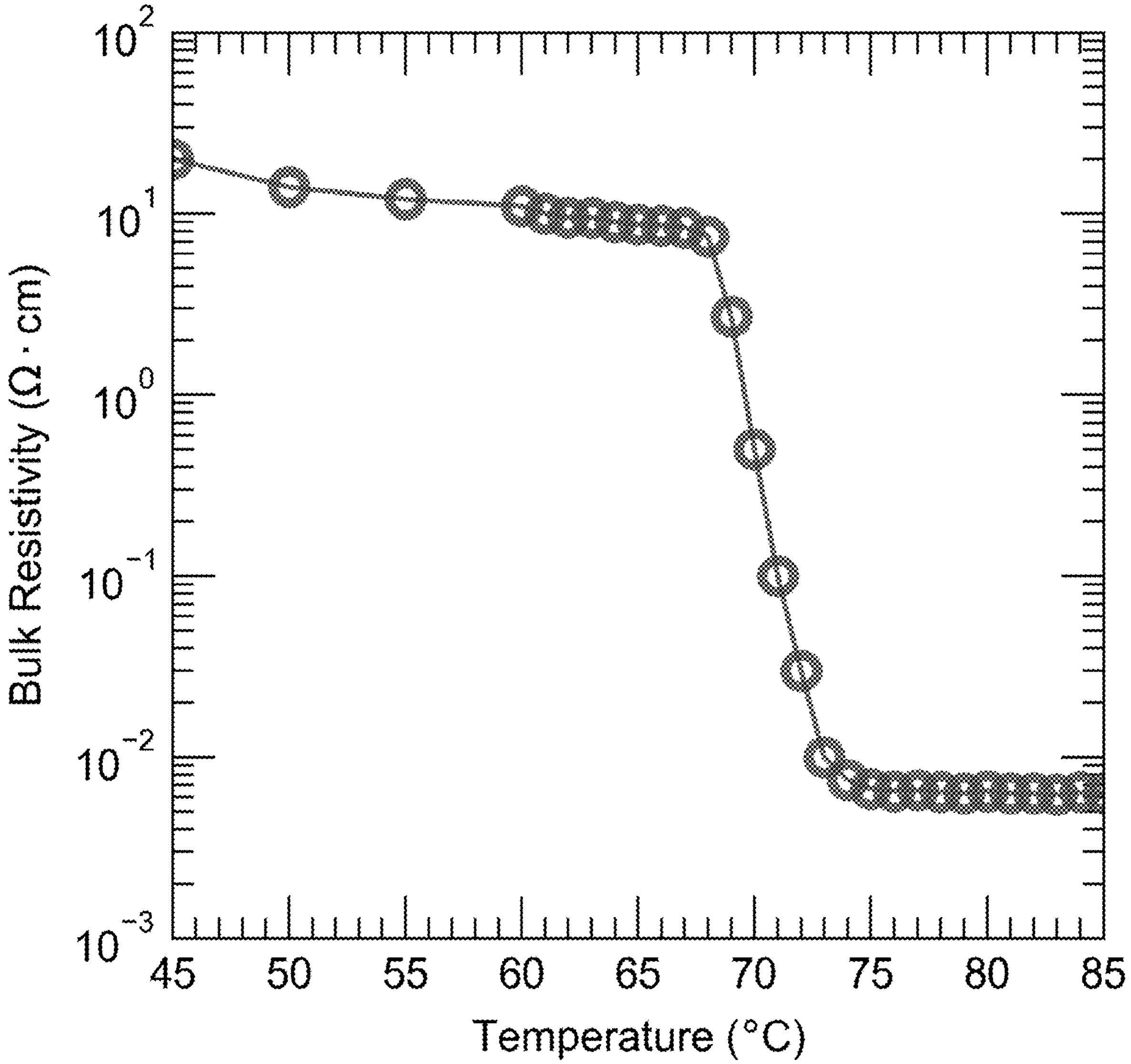
FIG. 8 is a graphical representation of resistivity versus temperature curve for example metal-insulator-transition material showing the transition between metallic and insulator states, in accordance with various example embodiments and implementations of the subject disclosure.

A polarization change can be made using software by controlling the heat profile. One such device has been simulated using commercial industry standard 3D finite element model. For simulations, varying input power, $P_{in}$, is applied at an input port, and based on the metal-insulator-transition material design dimensions, output power is observed. A higher volume of the material defines its bulk resistivity (insulating phase) at ambient temperature, and results in bulk conductivity (metallic phase) after transition temperature as shown in FIG. 8. The rise time constant of such phase transition is reported in FIG. 9. Based on the following measurements, in femtosecond (fs) transition time, the polarization of the photons can be changed for encryption of the key or for quantum random number generation.

Figure 9:
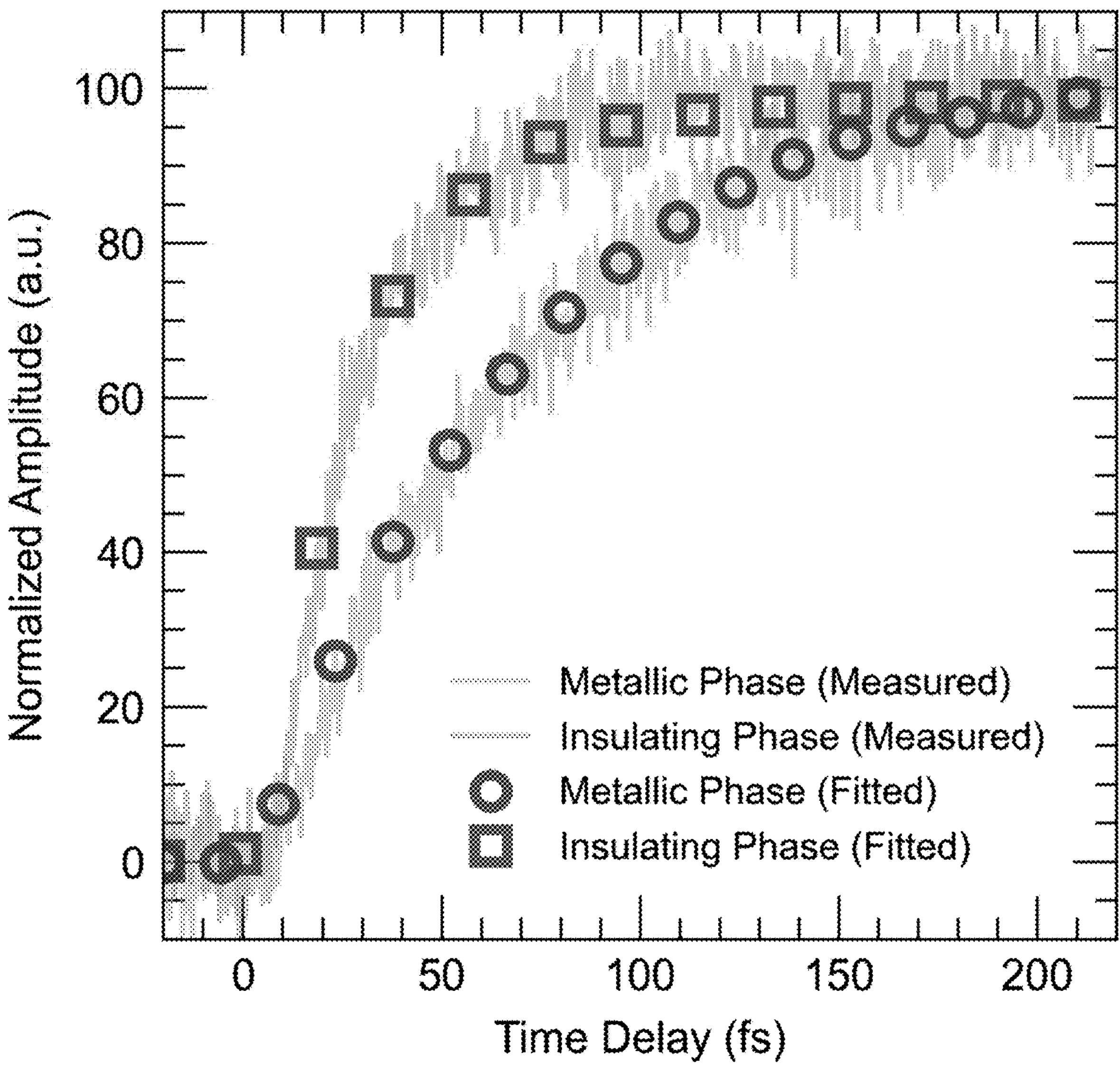
FIG. 9 is a graphical representation of the rise time constant of the example metal-insulator-transition material into the metallic and insulating phases, in accordance with various example embodiments and implementations of the subject disclosure.

Thus, FIG. 8 shows the resistivity versus temperature curve for one example metal-insulator-transition material showing the transition between the metallic and insulator states for one example metal-insulator-transition material. FIG. 9 shows the rise time constant of the material into the metallic and insulating phases. As can be seen, the unit cell dimensions such as inner spacing, inner pole width, outer pole width and length, cross pole activation or deactivation, can change the polarization from horizontal (H) to vertical (V), and from −45 degree to +45 degree within a few femtoseconds (fs).

In sum, the satellite photon generation source starts transmitting the photons, and based on the light intensity and random nature of the photons, the $VO_2$ material detects the polarization. The polarization information as a signature is transmitted to the transcoder device 104 for acknowledgement before the actual transmission occurs.

One or more example embodiments can be embodied in a system, such as described and represented herein. The system can include a transcoder device coupled to obtain a data signal, generated by a user equipment, intended for secure communication; the transcoder device can output photons associated with the signal. The system can include a quantum key distribution metasurface that receives the photons in first quantum states; the quantum key distribution metasurface can include metal-insulator transition material that can be controlled by a controllable heat profile to manipulate the first quantum states of the photons into second quantum states to result in a photon-manipulated signal. The transcoder device can transmit the photon-manipulated signal to a satellite configured to receive and process the photon-manipulated signal to generate a secure key for establishment of a secure communication link with the transcoder device, can receive the secure key, and can communicate the data as secure data via a secure communication link, based on the secure key, to the satellite.

The metal-insulator transition material can include vanadium dioxide, and the controllable phase change profile can be based on a controllable heater network or a controllable electrical stimulation network.

The second quantum states can include at least one of: changed polarizations of the photons in the second quantum states relative to the first quantum states, or changed phases of the photons in the second quantum states relative to the first quantum states.

The secure key can be a first secure key, and the quantum key distribution metasurface can be controlled to change the first secure key to a second secure key in a change pattern known to the satellite and the transcoder box.

The quantum key distribution metasurface can include a unit cell having insulating and conductive areas.

The conductive areas of the unit cell can correspond to a group of poles.

The group of poles can include two inner poles, two outer poles and a cross pole.

The two inner poles and the two outer poles can be substantially parallel to one another, and the cross pole can extend diagonally between a first pair that can include a first outer pole and a first inner pole, and a second pair that can include a second outer pole and a second inner pole.

The cross pole can be conductively coupled to the inner poles.

The controllable phase change profile can be a first phase change profile, the two inner poles can be separated by an inner spacing gap, and changing the first phase change profile to a second phase change profile can change the inner spacing gap, resulting in changing the quantum states of the photons from first quantum states to second quantum states.

The controllable phase change profile can be a first phase change profile, the cross pole can include a first length dimension, a first width dimension, and a first angle, and changing the first phase change profile to a second phase change profile can change at least one of: the first length dimension to a second length dimension, the first width dimension to a second width dimension, or the first angle to a second angle, resulting in changing the quantum states of the photons from first quantum states to second quantum states.

The quantum key distribution metasurface can include a unit cell that can include a conductive inner pole, the conductive inner pole can include a first length dimension, a first width dimension, and a first angle, and changing the first phase change profile to a second phase change profile can change at least one of: the first length dimension to a second length dimension, the first width dimension to a second width dimension, or the first angle to a second angle, resulting in changing the quantum states of the photons from first quantum states to second quantum states.

The quantum key distribution metasurface can include a unit cell that can include a conductive outer pole, the conductive outer pole can include a first length dimension, a first width dimension, and a first angle, and changing the first phase change profile to a second phase change profile can change at least one of: the first length dimension to a second length dimension, the first width dimension to a second width dimension, or the first angle to a second angle, resulting in changing the quantum states of the photons from first quantum states to second quantum states.

Figure 10:
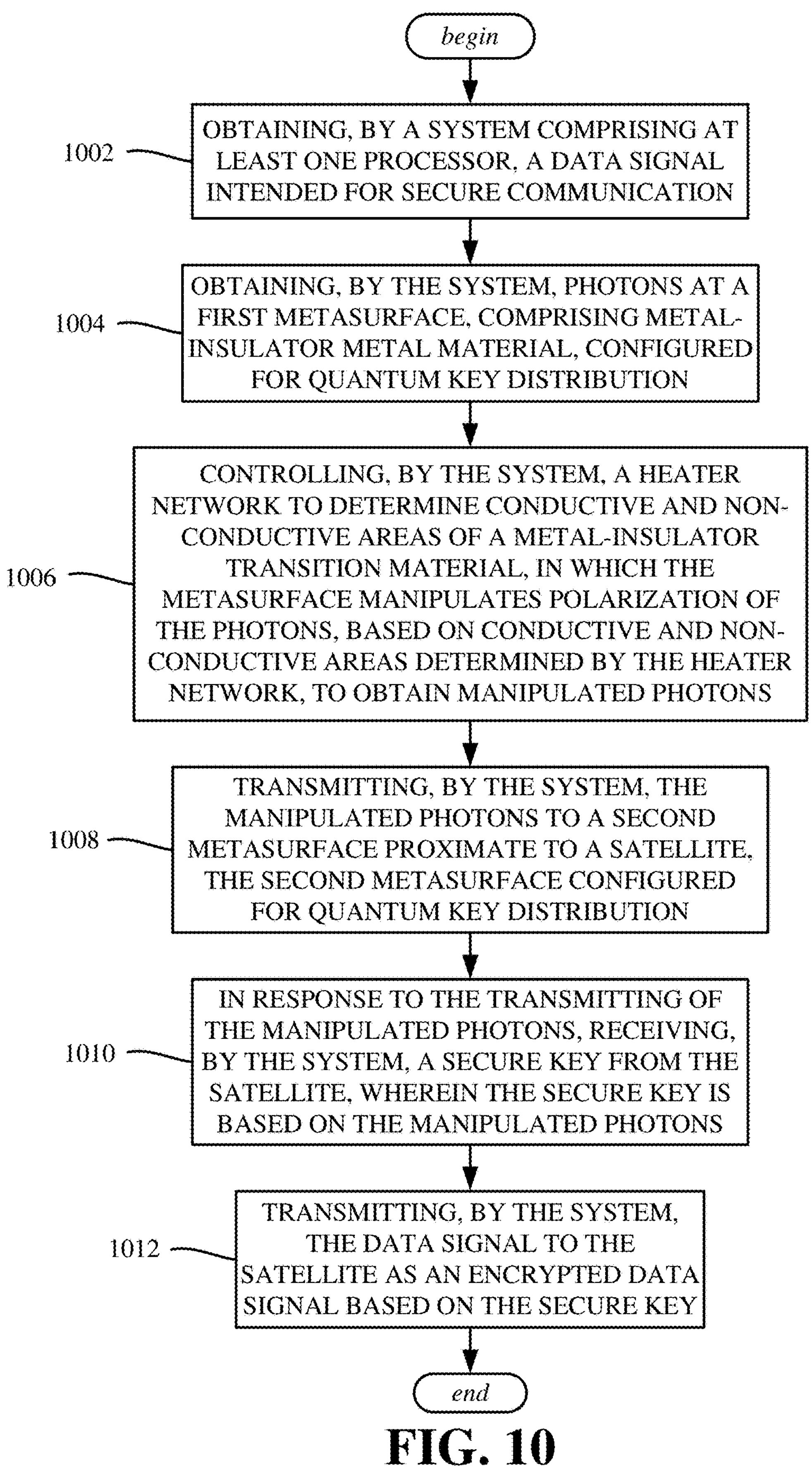
FIG. 10 is a flow diagram showing example operations related to photon manipulation based on controlling dimensions of metal-insulator metal material unit cells of a metasurface for quantum key distribution, in accordance with various example embodiments and implementations of the subject disclosure.

One or more example implementations and embodiments, such as corresponding to example operations of a method, or computer executable instructions/components can be represented in FIG. 10. Example operation 1002 represents obtaining, by a system that can include at least one processor, a data signal intended for secure communication. Example operation 1004 represents obtaining, by the system, photons at a first metasurface, that can include metal-insulator metal material, configured for quantum key distribution. Example operation 1006 represents controlling, by the system, a heater network to determine conductive and non-conductive areas of a metal-insulator transition material, in which the metasurface manipulates polarization of the photons, based on conductive and non-conductive areas determined by the heater network, to obtain manipulated photons. Example operation 1008 represents transmitting, by the system, the manipulated photons to a second metasurface proximate to a satellite, the second metasurface configured for quantum key distribution. Example operation 1010 represents, in response to the transmitting of the manipulated photons, receiving, by the system, a secure key from the satellite, wherein the secure key can be based on the manipulated photons. Example operation 1012 represents transmitting, by the system, the data signal to the satellite as an encrypted data signal based on the secure key.

The conductive and non-conductive areas can be first conductive and non-conductive areas, the manipulated photons can be first manipulated photons, and the secure key can be a first secure key. Further operations can include controlling, by the system, the heater network to determine second conductive and non-conductive areas of the metal-insulator transition material; the metasurface can manipulate polarization of the photons, based on the second conductive and non-conductive areas determined by the heater network, to obtain second manipulated photons transmitting, by the system, the second manipulated photons to the second metasurface, and, in response to the transmitting of the second manipulated photons, receiving, by the system, a second secure key from the satellite.

The second conductive and non-conductive areas correspond to a unit cell of the metasurface, the unit cell can include a group of poles having a pattern and dimensions corresponding to the first conductive and non-conductive areas, and controlling the heater network to the determine second conductive and non-conductive areas can change at least one of: the pattern of the group of poles, or at least one dimension of at least one pole of the group of poles.

One or more example embodiments can be embodied in a system, such as described and represented herein. The system can include a first quantum key distribution metasurface that can include one or more vanadium alloys, such as vanadium dioxide, vanadium trioxide, or vanadium pentoxide, controllably heated or electrically stimulated, at a first time, to result in a first state of conductive and non-conductive areas, and a transcoder device. The transcoder device can control a photon source to output first photons to a satellite via a second quantum key distribution metasurface coupled to the satellite; first quantum states of the first photons can be manipulated by the first quantum key distribution metasurface based on the first state of conductive and non-conductive areas. The transcoder device can receive a first secure key from the satellite based on the first quantum states of the first photons; at a second time, the first quantum key distribution metasurface can be controllably heated or electrically stimulated to result in a second state of conductive and non-conductive areas, in which the second state can be different from the first state. At the second time, the transcoder device can control the photon source to output second photons to the satellite; second quantum states of the second photons can be manipulated by the first quantum key distribution metasurface based on the second state of conductive and non-conductive areas. At the second time, the transcoder device can receive a second secure key from the satellite based on the second quantum states of second first photons.

The conductive areas of the unit cell correspond to unit cells, and one of the unit cells can include respective conductive poles that can include respective first dimensions that manipulate the first quantum states of the first photons at the first time, and that can include respective second dimensions that manipulate the second quantum states of the first photons at the second time.

The respective conductive poles can include inner poles, outer poles and a cross pole.

At the second time, the first quantum key distribution metasurface that can be controllably heated or electrically stimulated to change the second state of the metasurface relative to the first state by changing at least one of: a length of at least one of the inner poles, a width of at least one of the inner poles, an angle of at least one of the inner poles, a gap distance between the inner poles, a length of at least one of the outer poles, a width of at least one of the outer poles, an angle of at least one of the outer poles, a gap distance between the outer poles, a length of the cross pole, a width of the cross pole, or an angle of cross pole.

As can be seen, various implementations and embodiments of the technology described herein are directed to an optically transparent metasurface with $VO_2$ thin film-based unit cells facilitates implementing QKD at much lower cost. The phase transition properties of $VO_2$ allow for real-time, dynamic control over the optical characteristics of transmitted photons, and thus provides a relatively inexpensive solution for implementing QKD. Integrating a $VO_2$-based metasurface at the satellite optical transmitter and in a transcoder device with hardware-based polarization control overcomes many current implementation challenges, ensuring more optimal photon manipulation, minimizing signal degradation, and enhancing the overall security and efficiency of non-terrestrial network links to the transcoder device.

The integration of an optically transparent metasurface with VO2 film unit cells into a transcoder node for QKD in non-terrestrial networks offers numerous benefits. For one, the dynamic tunability of VO2 enables real-time control over the polarization and phase of photons, which is needed for the precise requirements of QKD protocols. This capability ensures that the quantum states of the photons can be accurately manipulated, providing robust security against eavesdropping and interception. Additionally, the transparency of the metasurface minimizes signal loss, preserving the integrity of the quantum signals over long distances. This results in higher fidelity in quantum key exchange and reduces the need for additional error correction, thereby improving the overall efficiency of the communication system.

The viability of the technology described herein is apparent from the inherent advantages of metasurfaces and the properties of $VO_2$. Metasurfaces are lightweight, compact, and can be fabricated using advanced nanofabrication techniques, making them suitable for integration into satellite systems where weight and space are at a premium. The phase transition property of $VO_2$, which can be triggered by temperature changes or electrical stimulation, allows for flexible and adaptive control mechanisms that can respond to varying environmental conditions encountered in space and terrestrial interfaces. Moreover, this approach is compatible with existing optical communication infrastructure, facilitating seamless integration into current non-terrestrial network frameworks. As a result, the deployment of this technology can significantly enhance the security and reliability of satellite-terrestrial communications, making it a viable and forward-looking solution, including for future non-terrestrial network applications.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

a transcoder device coupled to obtain a data signal, generated by a user equipment, intended for secure communication, wherein the transcoder device outputs photons associated with the signal; and a quantum key distribution metasurface that receives the photons in first quantum states, the quantum key distribution metasurface comprising metal-insulator transition material that is controlled by a controllable phase change profile to manipulate the first quantum states of the photons into second quantum states to result in a photon-manipulated signal, wherein the transcoder device:

transmits the photon-manipulated signal to a satellite configured to receive and process the photon-manipulated signal to generate a secure key for establishment of a secure communication link with the transcoder device, receives the secure key, and communicates the data as secure data via a secure communication link, based on the secure key, to the satellite.

2. The system of claim 1, wherein the metal-insulator transition material comprises at least one of: vanadium dioxide, vanadium trioxide, or vanadium pentoxide, and wherein the controllable phase change profile is based on a controllable heater network or a controllable electrical stimulation network.

3. The system of claim 1, wherein the second quantum states comprise at least one of: changed polarizations of the photons in the second quantum states relative to the first quantum states, or changed phases of the photons in the second quantum states relative to the first quantum states.

4. The system of claim 1, wherein the secure key is a first secure key, and wherein the quantum key distribution metasurface is controlled to change the first secure key to a second secure key in a change pattern known to the satellite and the transcoder box.

5. The system of claim 1, wherein the quantum key distribution metasurface comprises a unit cell having insulating and conductive areas.

6. The system of claim 5, wherein the conductive areas of the unit cell correspond to a group of poles.

7. The system of claim 6, wherein the group of poles comprises two inner poles, two outer poles and a cross pole.

8. The system of claim 7, wherein the two inner poles and the two outer poles are substantially parallel to one another, and wherein the cross pole extends diagonally between a first pair comprising a first outer pole and a first inner pole, and a second pair comprising a second outer pole and a second inner pole.

9. The system of claim 7, wherein the cross pole is conductively coupled to the inner poles.

10. The system of claim 7, wherein the controllable phase change profile comprises a first phase change profile, wherein the two inner poles are separated by an inner spacing gap, and wherein changing the controllable phase change profile changes the first phase change profile to a second phase change profile that changes the inner spacing gap, resulting in changing the quantum states of the photons from first quantum states to second quantum states.

11. The system of claim 7, wherein the controllable phase change profile comprises a first phase change profile, wherein the cross pole comprises a first length dimension, a first width dimension, and a first angle, and wherein changing the first phase change profile to a second phase change profile changes at least one of: the first length dimension to a second length dimension, the first width dimension to a second width dimension, or the first angle to a second angle, resulting in changing the quantum states of the photons from first quantum states to second quantum states.

12. The system of claim 1, wherein the quantum key distribution metasurface comprises a unit cell comprising a conductive inner pole, wherein the conductive inner pole comprises a first length dimension, a first width dimension, and a first angle, and wherein changing the controllable phase change profile comprises changing the first phase change profile to a second phase change profile changes at least one of: the first length dimension to a second length dimension, the first width dimension to a second width dimension, or the first angle to a second angle, resulting in changing the quantum states of the photons from first quantum states to second quantum states.

13. The system of claim 1, wherein the quantum key distribution metasurface comprises a unit cell comprising a conductive outer pole, wherein the conductive outer pole comprises a first length dimension, a first width dimension, and a first angle, wherein the controllable phase change profile comprises a first phase change profile, and wherein changing the first phase change profile to a second phase change profile changes at least one of: the first length dimension to a second length dimension, the first width dimension to a second width dimension, or the first angle to a second angle, resulting in changing the quantum states of the photons from first quantum states to second quantum states.

14. A method comprising:

obtaining, by a system comprising at least one processor, a data signal intended for secure communication;

obtaining, by the system, photons at a first metasurface, comprising metal-insulator metal material, configured for quantum key distribution;

controlling, by the system, a heater network to determine conductive and non-conductive areas of a metal-insulator transition material, wherein the metasurface manipulates polarization of the photons, based on conductive and non-conductive areas determined by the heater network, to obtain manipulated photons;

transmitting, by the system, the manipulated photons to a second metasurface proximate to a satellite, the second metasurface configured for quantum key distribution;

in response to the transmitting of the manipulated photons, receiving, by the system, a secure key from the satellite, wherein the secure key is based on the manipulated photons; and transmitting, by the system, the data signal to the satellite as an encrypted data signal based on the secure key.

15. The method of claim 14, wherein the conductive and non-conductive areas are first conductive and non-conductive areas, wherein the manipulated photons are first manipulated photons, wherein the secure key is a first secure key, and further comprising:

controlling, by the system, the heater network to determine second conductive and non-conductive areas of the metal-insulator transition material, wherein the metasurface manipulates polarization of the photons, based on the second conductive and non-conductive areas determined by the heater network, to obtain second manipulated photons, transmitting, by the system, the second manipulated photons to the second metasurface, and in response to the transmitting of the second manipulated photons, receiving, by the system, a second secure key from the satellite.

16. The method of claim 15, wherein the second conductive and non-conductive areas correspond to a unit cell of the metasurface, wherein the unit cell comprises a group of poles having a pattern and dimensions corresponding to the first conductive and non-conductive areas, and wherein the controlling of the heater network to the determine second conductive and non-conductive areas changes at least one of: the pattern of the group of poles, or at least one dimension of at least one pole of the group of poles.

17. A system, comprising:

a first quantum key distribution metasurface comprising one or more vanadium alloys controllably heated or electrically stimulated, at a first time, to result in a first state of conductive and non-conductive areas; and a transcoder device that:

controls a photon source to output first photons to a satellite via a second quantum key distribution metasurface coupled to the satellite, wherein first quantum states of the first photons are manipulated by the first quantum key distribution metasurface based on the first state of conductive and non-conductive areas, and receives a first secure key from the satellite based on the first quantum states of the first photons, wherein, at a second time, the first quantum key distribution metasurface is controllably heated or electrically stimulated to result in a second state of conductive and non-conductive areas, wherein the second state is different from the first state, and wherein, at the second time, the transcoder device:

controls the photon source to output second photons to the satellite, wherein second quantum states of the second photons are manipulated by the first quantum key distribution metasurface based on the second state of conductive and non-conductive areas, and receives a second secure key from the satellite based on the second quantum states of second first photons.

18. The system of claim 17, wherein the conductive areas of the unit cell correspond to unit cells, and wherein one of the unit cells comprises respective conductive poles comprising respective first dimensions that manipulate the first quantum states of the first photons at the first time, and comprising respective second dimensions that manipulate the second quantum states of the first photons at the second time.

19. The system of claim 18, wherein the respective conductive poles comprise inner poles, outer poles and a cross pole.

20. The system of claim 19, wherein at the second time, the first quantum key distribution metasurface is controllably heated or electrically stimulated to change the second state of the metasurface, relative to the first state, by changing at least one of: a length of at least one of the inner poles, a width of at least one of the inner poles, an angle of at least one of the inner poles, a gap distance between the inner poles, a length of at least one of the outer poles, a width of at least one of the outer poles, an angle of at least one of the outer poles, a gap distance between the outer poles, a length of the cross pole, a width of the cross pole, or an angle of cross pole.

* * * * *